(12) United States Patent
Meng et al.

(10) Patent No.: US 12,277,766 B2
(45) Date of Patent: Apr. 15, 2025

(54) INFORMATION GENERATION METHOD AND APPARATUS

(71) Applicant: Alibaba (China) Co., Ltd., Binjiang District Hangzhou (CN)

(72) Inventors: Yi Meng, Hangzhou (CN); Yi Xu, Hangzhou (CN)

(73) Assignee: ALIBABA (CHINA) CO., LTD., Hangzhou (CN)

( * ) Notice: Subject to any disclaimer, the term of this patent is extended or adjusted under 35 U.S.C. 154(b) by 396 days.

(21) Appl. No.: 17/743,496

(22) Filed: May 13, 2022

(65) Prior Publication Data
US 2022/0375223 A1    Nov. 24, 2022

(30) Foreign Application Priority Data

May 20, 2021    (CN) .......................... 202110554169.1

(51) Int. Cl.
| | |
|---|---|
| *G06V 20/40* | (2022.01) |
| *G06F 40/20* | (2020.01) |
| *G06T 7/11* | (2017.01) |
| *G06T 7/194* | (2017.01) |
| *G06T 11/60* | (2006.01) |
| *G10L 15/22* | (2006.01) |
| *G10L 15/26* | (2006.01) |
| *G10L 25/57* | (2013.01) |

(52) U.S. Cl.
CPC .............. *G06V 20/46* (2022.01); *G06F 40/20* (2020.01); *G06T 7/11* (2017.01); *G06T 7/194* (2017.01); *G06T 11/60* (2013.01); *G06V 20/41* (2022.01); *G06V 20/48* (2022.01); *G06V 20/49* (2022.01); *G10L 15/22* (2013.01); *G10L 15/26* (2013.01); *G10L 25/57* (2013.01); *G06T 2207/10016* (2013.01); *G06T 2207/20021* (2013.01)

(58) Field of Classification Search
CPC ........ G06V 20/46; G06V 20/41; G06V 20/48; G06V 20/49; G06V 10/82; G06V 20/70; G06F 40/20; G06F 40/30; G06T 7/11; G06T 7/194; G06T 11/60; G06T 2207/10016; G06T 2207/20021; G10L 15/22; G10L 15/26; G10L 25/57; G06N 3/045; G06N 3/08
USPC .......................................... 382/103, 106, 117
See application file for complete search history.

(56) References Cited

U.S. PATENT DOCUMENTS

| | | |
|---|---|---|
| 6,393,196 B1 | 5/2002 | Yamane et al. |
| 6,954,584 B2 | 10/2005 | Kashiwagi et al. |
| 7,274,860 B2 | 9/2007 | Okada et al. |

(Continued)

*Primary Examiner* — Negussie Worku
(74) *Attorney, Agent, or Firm* — James J. DeCarlo; Greenberg Traurig, LLP

(57) ABSTRACT

Provided in embodiments of the disclosure are an information generation method and apparatus. The information generation method comprises: obtaining an input video, and extracting video frames and audio data in the input video; processing the video frames to determine a target video frame, and processing the audio data to obtain text information; determining, based on a corresponding time of the target video frame in the input video and corresponding time of the text information in the input video, target text information corresponding to the target video frame; and processing the target video frame and the target text information to generate graphic and text information.

20 Claims, 8 Drawing Sheets

(56) References Cited

U.S. PATENT DOCUMENTS

| | | | | |
|---|---|---|---|---|
| 7,469,010 B2* | 12/2008 | Wu | ............... | H04N 19/527 |
| | | | | 375/E7.106 |
| 7,657,096 B2* | 2/2010 | Hosoda | ............... | G06V 20/40 |
| | | | | 348/700 |
| 8,494,058 B2* | 7/2013 | Chang | ............... | H04N 19/51 |
| | | | | 348/452 |
| 8,599,316 B2* | 12/2013 | Deever | ............... | H04N 5/275 |
| | | | | 348/700 |
| 8,670,648 B2* | 3/2014 | Thompson | ............... | H04N 5/76 |
| | | | | 386/239 |
| 9,058,845 B2 | 6/2015 | Fastige | | |
| 10,014,029 B2* | 7/2018 | Jo | ............... | H04N 5/93 |
| 10,108,709 B1* | 10/2018 | Frey | ............... | G06V 20/42 |
| 10,368,108 B2 | 7/2019 | Glen | | |
| 11,367,284 B2* | 6/2022 | Feng | ............... | G10L 13/02 |
| 11,581,020 B1* | 2/2023 | Hadap | ............... | G11B 27/036 |
| 11,676,385 B1* | 6/2023 | Yuan | ............... | G06V 10/462 |
| | | | | 382/181 |
| 2005/0193408 A1 | 9/2005 | Sull et al. | | |
| 2005/0193425 A1 | 9/2005 | Sull et al. | | |
| 2005/0204385 A1 | 9/2005 | Sull et al. | | |
| 2011/0170003 A1* | 7/2011 | Todo | ............... | H04N 21/2368 |
| | | | | 348/484 |
| 2011/0310235 A1 | 12/2011 | Sasaki et al. | | |
| 2012/0033039 A1 | 2/2012 | Sasaki et al. | | |
| 2012/0242802 A1 | 9/2012 | Tsukagoshi | | |
| 2012/0256951 A1 | 10/2012 | Tsukagoshi | | |
| 2014/0168277 A1 | 6/2014 | Ashley et al. | | |
| 2017/0195737 A1* | 7/2017 | Zhang | ............... | G06F 16/7867 |
| 2017/0206929 A1* | 7/2017 | Jo | ............... | H04N 5/93 |
| 2017/0244991 A1 | 8/2017 | Aggarwal et al. | | |
| 2021/0357653 A1* | 11/2021 | Feng | ............... | G06T 7/248 |
| 2022/0173654 A1* | 6/2022 | Giuliano | ............... | H02M 3/07 |
| 2024/0078807 A1* | 3/2024 | Li | ............... | G10L 15/02 |

\* cited by examiner (a)            (b)

INFORMATION GENERATION METHOD AND APPARATUS

CROSS-REFERENCE TO RELATED APPLICATIONS

This application claims priority to Chinese Patent Application No. 202110554169.1 filed on May 20, 2021, the contents of which are incorporated by reference.

BACKGROUND

Technical Field

Embodiments of the disclosure relate to the technical field of video processing, and in particular, to an information generation method and apparatus.

Description of the Related Art

In recent years, the way of marketing in the forms of live broadcasts and short videos are rapidly becoming popular. Various live broadcast and short video platforms have produced a large amount of live broadcast and short video content. In addition, recommendation articles for sharing and marketing in graphic and text forms are highly favored by users. For example, a large number of recommendation articles have emerged on some sharing websites. However, producing a recommendation graphic or text requires a blogger to carefully select and match images, label the images with brands, styles, etc., and also edit the text for an explanation, which is inefficient. Therefore, there is a desire for a method to solve the above problem.

BRIEF SUMMARY

In view of this, provided in embodiments of the disclosure is an information generation method. The embodiments of the disclosure also relate to an information generation apparatus, a computing device, and a computer-readable storage medium, to overcome the defect of low efficiency in generating graphic and text information in the prior art.

According to a first aspect of the embodiments of the disclosure, an information generation method is provided, including obtaining an input video and extracting video frames and audio data in the input video; processing the video frames to determine a target video frame, and processing the audio data to obtain text information; determining, based on a corresponding time of the target video frame in the input video and corresponding time of the text information in the input video, target text information corresponding to the target video frame; and processing the target video frame and the target text information to generate graphic and text information.

According to a second aspect of the embodiments of the disclosure, an information generation apparatus is provided, including an extraction module, configured to obtain an input video, and extract video frames and audio data in the input video; a processing module, configured to process the video frames to determine a target video frame, and process the audio data to obtain text information; a determination module, configured to determine, based on a corresponding time of the target video frame in the input video and corresponding time of the text information in the input video, target text information corresponding to the target video frame; and a generation module, configured to process the target video frame and the target text information to generate graphic and text information.

According to a third aspect of the embodiments of the disclosure, a computing device is provided, including a memory, a processor, and computer instructions stored in the memory and runnable on the processor, the processor implementing the steps of the information generation method when executing the computer instructions.

According to a fourth aspect of the embodiments of the disclosure, a computer-readable storage medium is provided, which stores computer instructions that implement the steps of the information generation method when executed by a processor.

According to the information generation method provided in the disclosure, by obtaining an input video and extracting video frames and audio data in the input video; processing the video frames to determine a target video frame, and processing the audio data to obtain text information; determining, based on a corresponding time of the target video frame in the input video and corresponding time of the text information in the input video, target text information corresponding to the target video frame; and processing the target video frame and the target text information to generate graphic and text information, automatic generation of the graphic and text information corresponding to the input video is achieved, the efficiency of graphic and text generation is increased, and human resources are freed.

DETAILED DESCRIPTION

Figure 1:
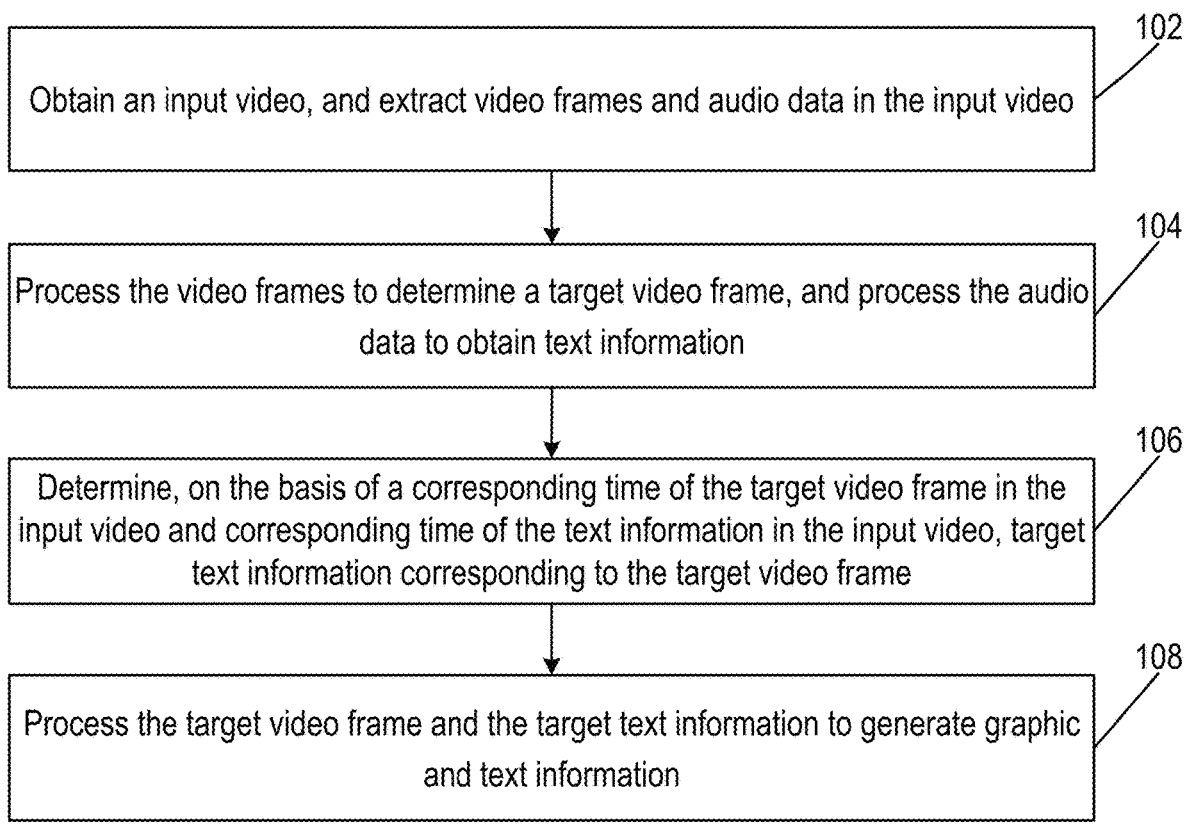
FIG. 1 is a flow diagram illustrating an information generation method provided by an embodiment of the disclosure.

The disclosure is described in detail below to facilitate a full understanding thereof. However, the disclosure can be implemented in many other ways different from those described herein, and those skilled in the art can make similar modifications without departing from the spirit of the disclosure. Therefore, the disclosure is not limited by the specific implementations disclosed below.

The terms used in one or more embodiments of the disclosure are only used for illustrative purposes of describing specific embodiments and are not intended to be limiting. The singular forms "a," "the," and "said" used in one or a plurality of embodiments of the disclosure and in the appended claims are also intended to include plural forms, unless the context clearly indicates otherwise. It should also be understood that the term "and/or" used in one or more embodiments of the disclosure refers to and includes any or all possible combinations of one or more associated listed items.

Although the terms "first," "second," etc., may be used to describe various types of information in one or more embodiments of the disclosure, such information should not be limiting. These terms are only used to distinguish one type of information from another type of information. For example, without departing from the scope of one or more embodiments of the disclosure, the "first" may also be referred to as the "second", and similarly, the "second" may also be referred to as the "first". Depending on the context, the word "if" as used herein may be construed to mean "when . . . " or "upon . . . " or "in response to determining."

First, the terminologies involved in one or more embodiments of the disclosure are defined as follows. The following definitions are intended only be elucidate concepts of the disclosure and are not intended to be unduly limiting and reasonable deviations from the defined terms are within the scope of the disclosure.

Recommendation article: a content marketing article that recommends and shares a product, feelings on usage, etc. to others in the form of a graphical and textual description.

Keyframe: a key image extracted from a video according to a certain rule.

Multi-modality: data being processed is presented in a variety of representations, such as audio, video, image, and text, and data and content in the final required formats are obtained by conversion from the variety of data forms.

Timing alignment: key images obtained from a video and text extracted from audio are aligned in time.

Instance segmentation: a machine automatically frames different instances from an image by using an object detection method, and then labels different instance regions pixel by pixel by using a semantic segmentation method.

SDK (software development kit): a collection of development tools used by software development engineers to build application software for specific software packages, software frameworks, hardware platforms, operating systems, and the like.

FFmpeg: a software product providing a keyframe extraction tool.

Mask R-CNN: a network architecture that mainly completes semantic segmentation of a target individual.

Mask: it can be understood as a bitmap, which is used to indicate which pixels need to be processed and which ones do not.

Audio track: parallel "tracks" displayed in sequencer software. Each audio track defines the attributes of the audio track, such as the timbre, sound bank, number of channels, input/output ports, volume, etc. of the audio track.

BERT (Bidirectional Encoder Representations from Transformers) model: the goal of the model is to perform training using a large-scale unlabeled corpus to obtain a semantic representation of text containing rich semantic information, and then fine-tune the semantic representation of the text in a specific natural language processing (NLP) task, and finally apply the semantic representation to the NLP task.

In the disclosure, an information generation method is provided, and the disclosure further relates to an information generation apparatus, a computing device, and a computer-readable storage medium, which will be described in detail in the following embodiments.

FIG. 1 shows a flow diagram illustrating an information generation method according to an embodiment of the disclosure, which specifically includes the following steps:

Step 102: Acquire an input video and extract video frames and audio data in the input video.

To facilitate sharing or other use of the content in a video or a live broadcast in a graphic and text form, the disclosure provides a solution for extracting and converting a core image from the video by using a multi-modal processing technique for massive live broadcast and short video content, extracting and generating text description by means of conversion from audio, temporally aligning the image and the text description, and finally automatically generating graphic and text information (such as a recommendation article). Specifically, the disclosure automatically generates graphic and text information for an input video (such as live broadcast and short video content), thereby avoiding manual selection and editing of images or text in the video and improving the efficiency of generating graphic and text information.

In practical applications, the input video may be a video of any type, any duration, or any format, such as a movie video, a live broadcast video, a teaching video, etc., which is not limited herein. The video contains multimodal data, such as image data (video frames) and audio data.

Step 104: Process the video frame to determine a target video frame and process the audio data to obtain text information.

Specifically, since an input video may contain many video frames, among which image contents of some adjacent video frames are the same or similar, to avoid repeated use (such as sharing) of images of the same scene, and to avoid a used image not meeting image requirements, it is usually necessary to process the video frames in the input video, that is, determine from the video frames a target video frame that meets usage requirements.

In addition, to facilitate the use of speech in the video in the form of text, it is also necessary to process the audio data in the input video, to obtain text information in the audio data that meet usage requirements. In some embodiments, the audio data may be converted into text information by using automatic speech recognition (ASR).

In some embodiments, the processing of video frames to determine a target video frame is specifically implemented by extracting keyframes from the video frames and processing the keyframes to determine the target video frame.

The keyframes may be video frames containing specific information (such as an object, a person, or a scene, etc.), or can be video frames of a certain resolution, sharpness, etc., which is not limited herein. In addition, video frames with a large scene change may be obtained using an FFmpeg tool. In practical applications, if the difference between two adjacent video frames is greater than a threshold, the later video frame in the adjacent video frames is extracted as a keyframe.

After extraction of the keyframes from the video frames, the number of extracted keyframes may be large, and the extracted keyframes may also include video frames that do not meet usage requirements. Therefore, it is necessary to further process the extracted keyframes to determine a target video frame to ensure the quality and applicability of the target video frame.

In this embodiment of the disclosure, the keyframes are first extracted, and then the target video frame is determined from the keyframes, thereby reducing the range for determining the target video frame and improving the efficiency in determining the target video frame.

Further, in an alternative implementation provided by this embodiment of the disclosure, the processing of keyframes to determine the target video frame is specifically implemented in the following manner: performing object segmentation on the keyframe, and determining object regions of respective objects included in the keyframes; performing saliency detection on the keyframes to obtain salient regions of the keyframes; and determining the target video frame from the keyframes based on the object regions and the salient regions.

Specifically, object segmentation may be performed on the keyframes, and by means of the object segmentation, a region containing an object (such as a physical object, a person, and other objects) in the video frames, i.e., an object region, may be determined.

Figure 2:
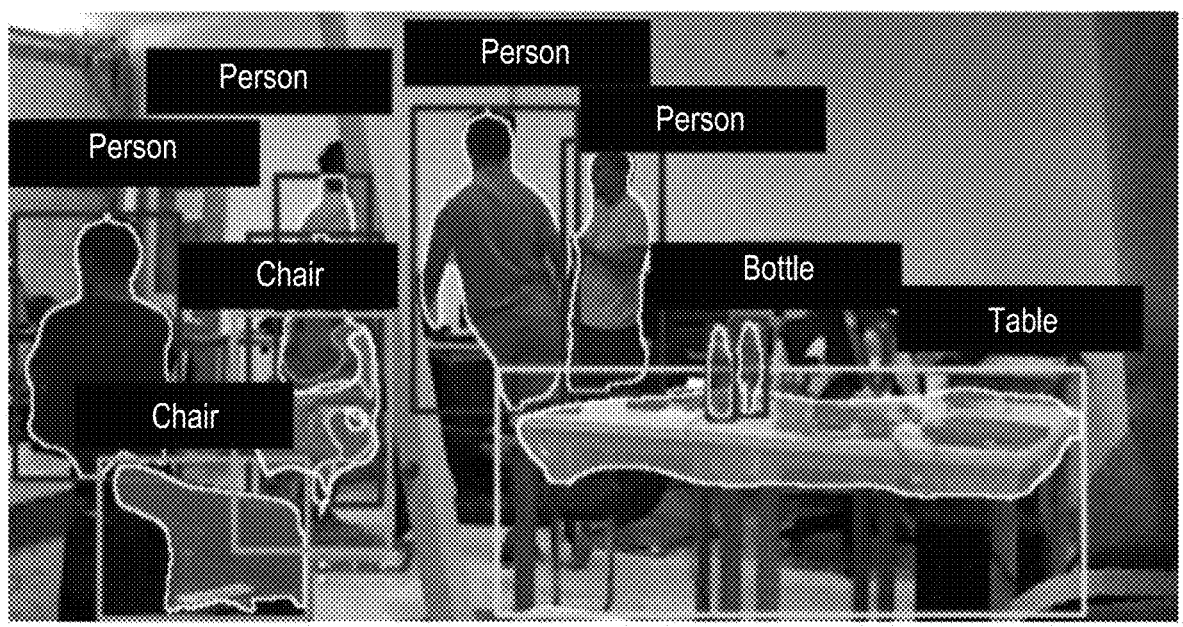
FIG. 2 is a block diagram of an instance segmentation result in an information generation method provided by an embodiment of the disclosure.

Specifically, the object segmentation may be implemented using a mask region-based convolutional neural network (R-CNN) model, i.e., an instance segmentation model, and the determined object region may be represented by a mask, in which case the object region is a mask region. Further, an automatic annotation tool may be used to annotate an image, to generate a mask and an instance label of the image as annotation data, and the image and an instance label of a corresponding region may be used as a training sample pair and inputted into an initially created instance segmentation model, to perform model training on the initially created instance segmentation model. Upon completion of the training, in an application process, a keyframe is inputted into the trained instance segmentation model to perform instance segmentation, and then an output of the instance segmentation model may be obtained as masks and semantic labels of several possible regions (regions containing instances, identified by white lines), such as a person, chair, bottle, specifically as shown in FIG. 2 below. By using the outputted masks, the regions containing the instances (entities), i.e., object regions, may be determined. In addition, saliency detection may further be performed on the extracted keyframes, where the saliency detection may be understood as simulating human visual characteristics using an intelligent algorithm to extract salient regions in the image (i.e., regions of interest to humans), i.e., salient regions.

Further, based on determining an object region and a salient region of each instance in a keyframe, it is possible to determine whether the keyframe is a target video frame according to information such as the size and distribution of the object region, and/or information such as the size and distribution of the salient region. In this way, an image that actually contains a commodity and a physical object can be acquired, and an image that does not contain a core salient object can be filtered out, such that the selected target video frame contains a salient object region, and the target video frame better satisfies usage requirements. For example, during a live broadcast, if a broadcaster is not in the background of a live broadcast room for a moment, an entity object obtained after instance segmentation on the image is also useless, and there is no salient target entity (target object) of concern, and the image can be filtered out by means of saliency detection.

It should be noted that the execution order between the two steps of performing instance segmentation on the keyframes and performing saliency detection on the keyframes is not limited.

Figure 3:
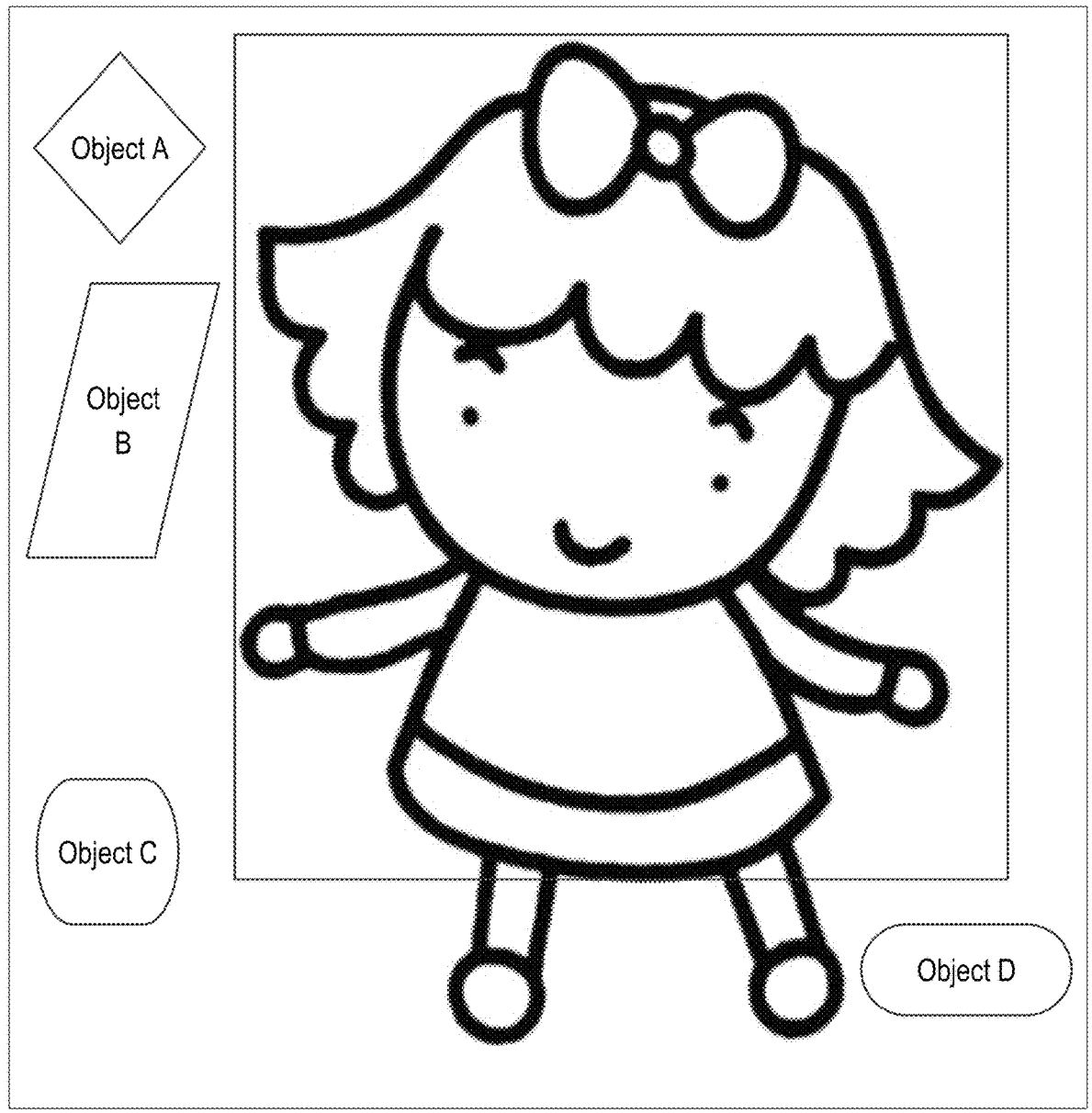
FIG. 3 is a block diagram of a target video frame in an information generation method provided by an embodiment of the disclosure.

In addition, a target video frame may also be determined directly according to an object region. For example, a target video frame containing an image portion (object region) of a core physical object may be selected from keyframes according to the position, size, shape, etc. of the object region. Specifically, as shown in FIG. 3. the person and shirt in the rectangular box are suitable for a recommendation article, but a large number of backgrounds (such as object A, object B, object C, object D) are meaningless. In this case, a target video frame in which object regions are in middle positions of keyframes and the proportion of the object regions in the keyframes reaches a proportion threshold may be selected from video frames with many interferences (many object regions) according to the positions of the object regions. In addition, the keyframes may also be selected according to the number of object regions in the keyframes. For example, a target video frame with less than three object regions is selected from the keyframes, which is not limited herein.

Further, in an alternative implementation provided by this embodiment of the disclosure, the determining the target video frame from the keyframes based on the object regions and the salient regions is specifically implemented in the following manner: determining overlapping regions between the object regions and the salient regions; and determining the target video frame from the keyframes based on proportion information and/or position information of the overlapping regions in the keyframes.

Specifically, since an object region is a region of an object (such as a physical object, a person, etc.) contained in a keyframe, and a salient region is a region salient in the keyframe, by intersecting the object region and the salient region, an overlapping region between the two regions may be obtained. In this case, the target video frame is determined from the keyframes according to the proportion information of overlapping regions in the keyframes (for example, if the size of the overlapping region is 30% of the keyframe size, the proportion information is 30%), and/or position information (such as a center position, an upper side, a left side, etc. of the overlapping region in the keyframe), ensuring that the target video frame is a video frame in which the overlapping region is the most salient region in the keyframe, and improving the applicability of the target video frame.

Further, after the target video frame is determined, object information of the target object contained in the target video frame may further be determined, such that the target video frame can be used more pertinently according to the object information. In an alternative implementation provided by this embodiment of the disclosure, after the processing the video frames to determine a target video frame, the method further includes comparing the target video frame with a pre-stored object image for similarities; and determining, based on the comparison result, object information of the target object contained in the target video frame.

The pre-stored object image may be understood as an image containing an object pre-stored for a usage scene. In some embodiments, the pre-stored object image may be at least one, and by comparing the target video frame with the pre-stored object image for similarities, it can be determined whether the object contained in the target video frame is the same object as the object in the pre-stored object image.

Further, the comparison result of the similarity comparison may be consistent or inconsistent. In practical applications, a similarity degree may be obtained by sequentially comparing the target video frame with at least one pre-stored object image for similarities, and the similarity degree may be compared with a preset similarity degree threshold. If the obtained similarity degree is greater than or equal to the similarity degree threshold, the comparison result is consistent; if the obtained similarity degree is less than the similarity degree threshold, the comparison result is inconsistent. In the case where the comparison result is consistent, it is determined that the object contained in the video frame is the same object as the object in the pre-stored object image, and object information of the object in the pre-stored object image may be used as the object information of the target object in the target video frame; if the comparison result is inconsistent, it indicates that the object contained in the target video frame is not the same object as the object in the pre-stored object image, and the target video frame may be discarded, or no operation is necessary.

The object information may be information such as an object name, an object identifier, an object color, and/or an object brand, which is not limited herein. In addition, in an alternative implementation provided by this embodiment of the disclosure, the processing of the video frames to determine a target video frame is specifically implemented in the following manner: comparing the video frames with a pre-stored object image for similarities; determining a target object in the video frames based on the comparison result; and performing selection among the video frames based on object information of the target object to determine the target video frame.

The pre-stored object image may be understood as an image containing an object pre-stored for a usage scene. In some embodiments, the pre-stored object image may be at least one, and by comparing the video frames with the pre-stored object image for similarities, it can be determined whether the object contained in the video frames is the same object as the object in the pre-stored object image.

Further, the comparison result of the similarity comparison may be consistent or inconsistent. In practical applications, similarity degrees may be obtained by sequentially comparing the video frames and at least one pre-stored object image for similarities, and the similarity degrees may be compared with a preset similarity degree threshold. If the obtained similarity degree is greater than or equal to the similarity degree threshold, the comparison result is consistent; if the obtained similarity degree is less than the similarity degree threshold, the comparison result is inconsistent. In the case where a comparison result is consistent, it is determined that an object contained in a video frame is the same object as the object in the pre-stored object image, and object information of the object in the pre-stored object image may be used as object information of the target object in the video frame; if the comparison result is inconsistent, it indicates that the object contained in the video frame is not the same object as the object in the pre-stored object image, and the video frame may be discarded, or no operation is necessary.

The object information may be information such as an object name, an object identifier, an object color, and/or an object brand, which is not limited herein.

In this embodiment of the disclosure, the video frames are selected based on the object information, ensuring that the target video frame contains information meeting usage requirements.

Further still, for the target video frame to better fit a usage scene and make the target video frame more aesthetically appealing, in an alternative implementation provided by this embodiment of the disclosure, the performing selection among the video frames based on object information of the target object to determine the target video frame is implemented in the following manner: performing background replacement on the video frames based on an object region of the target object; and performing selection among the video frames that have undergone background replacement according to a preset aesthetic feature, to determine the target video frame.

Figure 4:
FIG. 4 is a block diagram of background replacement in an information generation method provided by an embodiment of the disclosure.
Figure 4:

The background of an image region outside the object region where the target object is located is replaced. In this case, since a scene where the target object is located may not fit a usage scene of the target video frame, the background replacement can be utilized to make the target video frame more aesthetically appealing and appropriate. Specifically, a specific implementation process of the background replacement may be first matting the object region of the target object, and then using an image synthesis SDK to add a background to the object region of the target object, specifically as shown in FIG. 4. FIG. 4(a) shows a result after matting, and FIG. 4(b) shows a result after background addition.

Further, after the backgrounds of target video frames are replaced, the target video frames that have undergone background replacement may further be selected in an aesthetic manner (for example, according to a preset aesthetic feature), to select an image with better quality, such that the selected target video frame is more aesthetically appealing, where the preset aesthetic feature may be a feature such as a color difference between front and rear backgrounds, a texture difference, and a positional relationship of salient regions, which is not limited herein.

In addition, a video frame may contain a plurality of target objects. Therefore, the backgrounds of these target objects may be replaced as a whole, and one target object may be determined among the plurality of target objects according to a preset replacement rule, and background replacement is performed on the determined target object in the video frame, which is not limited herein.

It should be noted that in the examples of the disclosure, the various manners of determining the target video frame and the subsequent processing methods of the determined target video frame may be cooperatively performed in a superimposed or combined manner. For example, the background replacement of the video frames based on the object region of the target object may be combined with the aforementioned processing method of extracting the keyframes from the video frames, and performing background replacement on the keyframes based on the object region of the target object. In this case, for the object region of the target object, an object contained in an overlapping region in target video frames may be determined as the target object, and background replacement is performed based on the object region of the target object.

In practical applications, after the target video frame is obtained, there may still be a large number of target video frames. Therefore, the target video frames may continue to be selected to further ensure the quality of the target video frame. In an alternative implementation provided by this embodiment of the disclosure, the method includes after the performing selection among the video frames that have undergone background replacement to determine the target video frame, determining an image type of the target video frame based on proportion information and/or position information of the target object in the target video frame; and performing selection among the target video frames to obtain a target video frame having an image type being a first type.

Specifically, after the target object in the target video frame is determined as described above, the image type of the target video frame may be determined according to the proportion of the size of the object region where the target object is located in the size of the keyframe, and/or position information (such as a center position, an upper part, a left side, etc. of the object region in the keyframe).

The image type may be divided into a first type (for example, an applicable type, an important type, etc.), a second type (for example, an inapplicable type, an unimportant type, etc.), etc., which is not limited herein.

In some embodiments, a classification model may be used to mark and filter selected images (target video frames) again, to select an image suitable for a certain usage scene (such as a recommendation article). Specifically, a model may be trained by using an image and applicability and inapplicability information labeled on the image according to proportion information and/or position information as a training sample pair, to obtain a classification model. The target video frame is inputted into the trained classification model for classification, and label information (type) indicating applicability or inapplicability of the target video frame outputted by the classification model may be obtained.

After classification of the target video frames, a target video frame having an image type being the first type is selected as the target video frame, further reducing the number of target video frames, and also improving the use quality of the target video frames. In addition to the above processing of the video frames in the input video, audio data also needs to be processed. In an alternative implementation provided by this embodiment of the disclosure, the processing of the audio data to obtain text information is specifically implemented in the following manner: performing text recognition on the audio data to obtain initial text information; and performing selection among the initial text information according to the object information, to obtain the text information.

In practical applications, after the initial text information is obtained from the audio data by using a speech recognition technique, the text information may further be selected, for example, by using a validity classification method. In some embodiments, each segment in the initial text information may be labeled and classified (such as valid or invalid) according to the object information by using a pre-trained classification model such as a lite BERT (AL-BERT) model.

Specifically, text containing the object information may be classified to be in a valid state, or text containing preset valid information (such as an object function, an object name, etc.) in the object information may be classified to be in a valid state, and text containing preset valid information in the object information (such as an object shape, an object color, etc.) may be classified to be in an invalid state, etc., which is not limited herein.

In addition, in the case where the input video is a sales live broadcast, and a usage scene of the graphic and text information is a recommendation scene, chat text information with a customer or with a plurality of persons may be determined to be in an invalid state. Text information such as an object description for the target object (product), a usage scene of the target object, and/or a detailed explanation for the target object is determined to be in a valid state.

Further, the text information in the valid state may also be undergoing coherence processing. This is because there may be incoherent sentences in the text information. Therefore, it is necessary to perform text coherence processing on the text information. Specifically, a text coherence processing model (such as a pre-trained BERT model) may be used to perform coherence processing on the text information, such as deleting incoherent words in automatic speech recognition (ASR) result, to obtain mora e natural and coherent sentences, i.e., coherence processed text information increases the pertinence and readability of the text information in graphic and text information.

For example, in the case where the input video is a sales live broadcast and the usage scene of graphic information is the recommendation, during training of the BERT model, an input of the model training may be boilerplate text after filtration by a broadcaster (validity filtration) and mined recommendation articles of a corresponding commodity. Upon completion of the training, a boilerplate text produced after filtration by the broadcaster is inputted into the trained BERT model, and then a rewritten recommendation article outputted by the BERT model may be obtained.

Step 106: Determine, based on a corresponding time of the target video frame in the input video and the corresponding time of the text information in the input video, the target text information corresponding to the target video frame.

The corresponding time of the target video frame in the input video may be understood as a progression time of the target video frame in the input video. For example, the duration of the input video is three minutes, and the display time of the target video frame in the input video is the second minute, in which case the corresponding time of the target video frame in the input video is the second minute. Similarly, the corresponding time of the text information in the input video may be understood as a progression time of the audio data to which the text information belongs in the input video.

In practical applications, based on these two times, the target video frame and the text information may be temporally aligned, and after the timing alignment, the target text information for the target video frame may be determined.

In some embodiments, in an alternative implementation provided by this embodiment of the disclosure, the determining, based on a corresponding time of the target video frame in the input video and corresponding time of the text information in the input video, target text information corresponding to the target video frame includes: determining a target time interval based on corresponding times of the i-th target video frame and the (i+1)-th target video frame in the input video; determining text information in the time interval based on the corresponding times of the text information in the input video; and determining the text information in the time interval as target text information corresponding to the i-th target video frame.

In some embodiments, i is a positive integer, a minimum value of i is 1, and a maximum value thereof is the number of target video frames, in which case the i-th target video frame may be understood as a video frame having a progression time earlier in two adjacent target video frames after corresponding times of the target video frames in the input video are sorted; the (i+1)-th target video frame may be understood as a video frame having a progression time later in the aforementioned two adjacent target video frames.

It should be noted that since the video frames in the input video are selected, the two adjacent target video frames (the i-th target video frame and the (i+1)-th target video frame) may not be adjacent video frames in the original input video. In this embodiment of the disclosure, all of the text information in the time interval (i.e., a target time interval) between the two target video frames is used as target text information corresponding to the earlier target video frame (i.e., the i-th target video frame) in the two adjacent target video frames, thereby retaining a description of the text information for the target video frame to a greater extent, and conducing to the completeness of generated graphic and text information described below.

Step 108: Process the target video frame and the target text information to generate graphic and text information.

Specifically, based on obtaining target video frames and target text information, these target video frames and the target text information may be combined according to a preset rule to generate graphic and text information. Specifically, the preset rule can be combining the target video frames first, then combining the target text information, and finally combining the two combinations, or separately combining target text information corresponding to respective target video frames, and then combining the combinations, etc., which is not limited herein.

Based on the aforementioned performing selection among the video frames according to the object information of the target object to determine the target video frame, accordingly, the processing of the target video frame and the target text information to generate graphic and text information is implemented in the following manner: grouping the target video frame according to the object information to generate at least one group; and combining a target video frame of each group with corresponding target text information to generate graphic and text information of each group.

Specifically, after the object information of the target object in the target video frame is determined as described above, the target video frame may be grouped according to the object information. This is because different graphic and text information may be generated according to different object information, such that a user can understand the target object in a targeted way, improving the viewing experience of the user.

For example, when object information is a commodity identifier of a commodity in a commodity library, target video frames are grouped according to the product identifier, and a target video frame of each group is combined with corresponding target text information to generate graphic and text information for each commodity.

In practical applications, since usage scenes, display characteristics, etc. of target video frames may vary, before the generation of graphics and information, it is necessary to determine image description types of the target video frames. In an alternative implementation provided by this embodiment of the disclosure, the method further includes, before the processing the target video frame and the target text information to generate graphic and text information, performing image classification on the target video frame, and determining an image description type corresponding to the target video frame; accordingly, the processing the target video frame and the target text information to generate graphic and text information comprises: performing selection, according to a preset number, among the target video frames corresponding to each image description type to obtain a type of video frames; and generating the graphic and text information by combining the type of video frames with corresponding target text information.

The image description type can be a scene type (such as indoor, outdoor, etc.) of a scene displayed in a video frame, a display type of an object contained therein (such as side display, front display, etc.), etc., which is not limited herein.

Performing image classification on the target video frame and determining an image description type corresponding to the target video frame may include performing selection among the target video frame using an image classification algorithm. Specifically, keyframe images acquired in advance and labels (such as overall product display, detail display, and product use effects) corresponding to the keyframe images may be used as training sample pairs to train an initially created classification model that uses an image classification algorithm, to obtain a trained classification model.

Upon completion of the training, the target video frame is inputted into the classification model, to obtain an image description type outputted by the classification model (such as an overall product display type, a product detail display type, product use effects, etc.).

Further, after the image description type corresponding to the target video frame is determined, when there are many target video frames of each image description type, a preset number (such as 2, 3, etc.) of video frames (i.e., a type of video frames) may be selected from the target video frames corresponding to each image description type, and the type of video frames are further combined with the target text information to generate graphic and text information.

For example, using the generation of a recommendation article as an example, text content corresponding to the same scene is selected according to a scene of an image (target video frame) for matching. In this case, for each product, image description type labels are divided into product display, product details, product use effects, etc. One or two images are selected for each image description type. In addition, because a live broadcast video will be relatively long and there will be a plurality of products, it is not suitable for too many products to be presented in one article. Images are grouped according to object identifiers (item_id) corresponding to the images, and one group includes three or four products, which are combined with text corresponding to the three or four product images to generate a recommendation article. Finally, a plurality of recommendation articles corresponding to the live broadcast video are outputted.

In some embodiments, in an alternative implementation provided by this embodiment of the disclosure, the processing the target video frame and the target text information to generate graphic and text information is specifically implemented by inputting the target video frame and the target text information into a graphic and text information generation model to obtain graphic and text information outputted by the graphic and text information generation model.

The graphic information generation model is pre-trained, and the target video frame and the target text information are processed by the graphic information generation model, to obtain the graphic and text information outputted by the graphic information generation model, thereby improving the efficiency in generating the graphic and text information.

Figure 5:
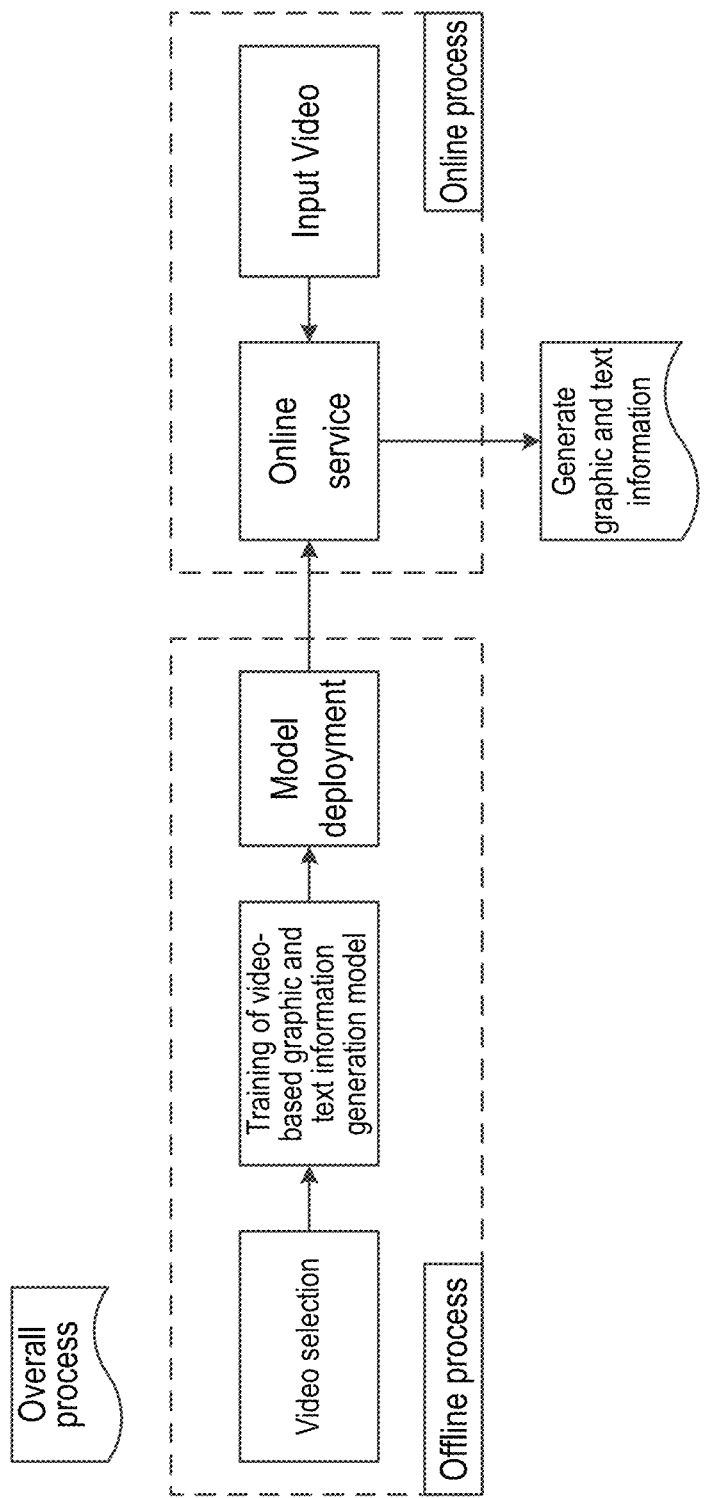
FIG. 5 is a flow diagram illustrating an information generation method provided by an embodiment of the disclosure.

As shown in FIG. 5, a training process of the offline graphic and text information generation model is as follows: select, based on a rule, videos suitable for generating graphic and text information, such as live videos and short videos; and use the selected videos to train the graphic and text information generation model, and deploy the trained graphic and text information generation model to an online service.

An online process after the graphic and text information generation model is deployed online is as follows: the graphic and text information generation model provides an online service, inputting an input video into the graphic and text information generation model (invoking an online service interface), the graphic and text information generation model performing the processing in the above steps 102 to 106 on the input video to determine a target video frame and target text information, and generating graphic and text information for the determined target video frame and target text information, to generate graphic and text information.

In practical applications, to further improve graphic and text information generation effects of the graphic and text information generation model, a reference video may further be collected in advance, and the reference video is processed according to the above steps 102 to 106 to determine a reference video frame and reference text information in the reference video. The graphic and text information generation model is updated by referring to the video frame and the reference text information to generate an updated graphic and text information generation model.

In summary, according to the information generation method provided in the disclosure, by obtaining an input video and extracting video frames and audio data in the input video; performing selection among the video frames to determine a target video frame, and performing text recognition on the audio data to obtain text information; determining, based on a corresponding time of the target video frame in the input video and corresponding time of the text information in the input video, target text information corresponding to the target video frame; and processing the target video frame and the target text information to generate graphic and text information, automatic generation of the graphic and text information corresponding to the video is achieved, the efficiency of graphic and text generation is increased, and human resources are freed.

Figure 6:
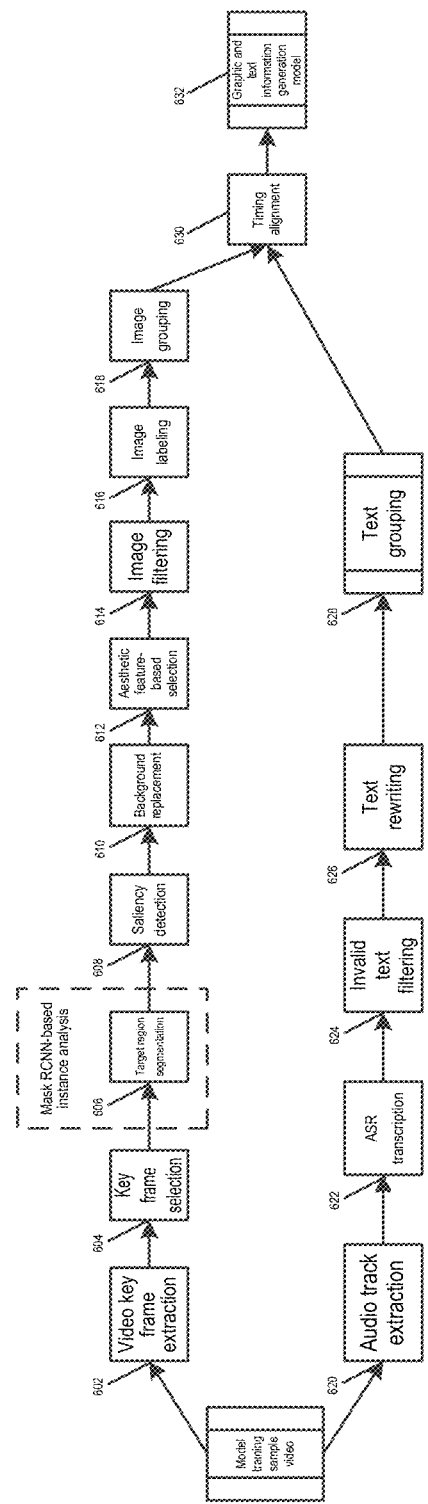
FIG. 6 is a flow diagram illustrating a model training in an information generation method provided by an embodiment of the disclosure.

The information generation method is further described below by using an application of the information generation method provided in the disclosure in an actual scenario as an example with reference to FIG. 6. FIG. 6 shows a flow diagram illustrating a model training in an information generation method provided by an embodiment of the disclosure, which specifically includes the following steps:

Step 602: Video keyframe extraction.

Specifically, keyframe extraction refers to performing keyframe extraction on video frames in a sample video for model training. The candidate video may be understood as the video selected in FIG. 5 in the above method embodiment.

Step 604: Keyframe selection.

Specifically, for keyframe selection, reference may be made to the processing of keyframes in the foregoing method embodiment to determine a target video frame.

Step 606: Target region segmentation.

Specifically, a target region (an object region including an object) in the keyframe may be segmented based on instance segmentation of a mask R-CNN, to obtain at least one object region.

Step 608: Saliency detection.

Specifically, saliency detection may be performed on the keyframes, or saliency detection may be performed on the aforementioned keyframes with the object region to obtain a salient region.

Step 610: Background replacement.

Specifically, the intersection of the object region and the salient region in the keyframe may be acquired to obtain an overlapping region of the two regions, and an object region of a target object is determined based on the overlapping region, and the background of an image region outside the object region is replaced.

Step 612: Aesthetic feature-based selection.

Specifically, aesthetic feature-based selection refers to performing selection among the video frames that have undergone background replacement according to aesthetic features, to select better quality target video frames.

Step 614: Image filtering.

Specifically, the images (target video frames) may be filtered according to proportion information and/or position information of the target object in the images (target video frames).

Step 616: Image labeling.

Specifically, image labeling refers to adding an applicability or inapplicability label to the filtered image (target video frame), thereby obtaining a target video frame having an applicability label added.

Step 618: Image grouping.

Specifically, image groups are generated by grouping the images according to object information of the target object.

The above steps are for processing of the video frames in the candidate video.

Step 620: Audio track extraction.

Specifically, the audio track extraction refers to extracting an audio track from the candidate video trained by the above model. Specifically, the audio track may be understood as the audio data in the foregoing information generation method embodiment.

Step 622: ASR transcription.

Specifically, the audio track is transcribed into initial text information by means of ASR.

Step 624: Invalid text filtering.

Specifically, the above initial text information generated by transcription is subjected to validity filtering according to the object information of the target object, to obtain valid text information.

Step 626: Text rewriting.

Specifically, text rewriting may be understood as performing coherence processing on the above filtered text information (valid text information) by using a model to obtain text information.

Step 628: Text grouping.

Specifically, text groups are generated by grouping the coherence processed text information according to the object information.

Step 630: Timing alignment.

The above image groups generated in step 618 and the above text groups generated in step 628 are subjected to timing alignment according to corresponding times of images in the candidate video and corresponding times of text in the text groups in the candidate video, to determine correspondences between the image groups and the text groups. Further, sample graphic and text information is generated according to the corresponding image groups and text groups.

Step 632: Use the above sample video and sample graphic and text information as a training sample pair to perform model training to generate a graphic and text information generation model.

In summary, by means of the model training in the information generation method provided in the disclosure, by obtaining a sample video, and extracting video frames and audio data in the sample video; performing selection among the video frames to determine a target video frame, and performing text recognition on the audio data to obtain text information; determining, based on a corresponding time of the target video frame in the input video and corresponding time of the text information in the input video, target text information corresponding to the target video frame; processing the target video frame and the target text information to generate sample graphic and text information; and performing model training based on the sample video and the sample graphic and text information to obtain a graphic information generation model, the graphic and text information generation model is trained, to automatically generate graphic and text information corresponding to a video by the trained graphic and text information generation model, increasing the efficiency of graphic and text generation, and freeing human resources.

Figure 7:
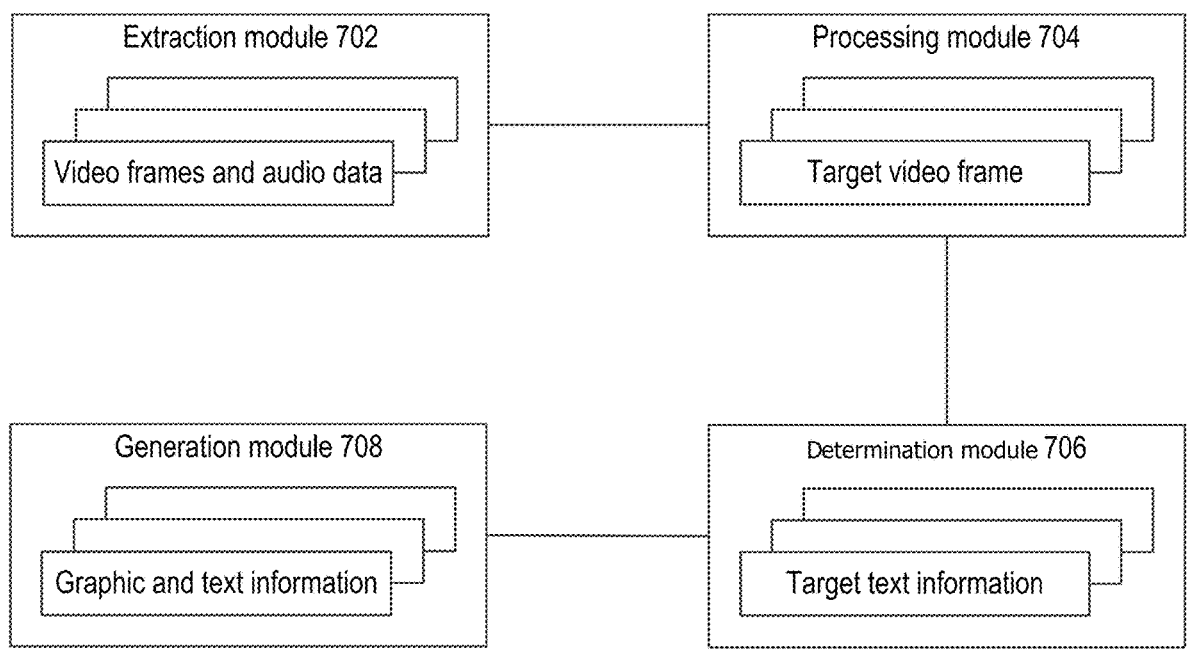
FIG. 7 is a block diagram of an information generation apparatus provided by an embodiment of the disclosure.

The disclosure further provides an information generation apparatus embodiment corresponding to the foregoing information generation method embodiment. FIG. 7 shows a block diagram of an information generation apparatus provided by an embodiment of the disclosure. As shown in FIG. 7, the apparatus includes: an extraction module 702, configured to obtain an input video, and extract video frames and audio data in the input video; a processing module 704, configured to process the video frames to determine a target video frame, and process the audio data to obtain text information; a determination module 706, configured to determine, based on a corresponding time of the target video frame in the input video and corresponding time of the text information in the input video, target text information corresponding to the target video frame; and a generation module 708, configured to process the target video frame and the target text information to generate graphic and text information.

Optionally, the processing module 704 is further configured to extract keyframes from the video frames, and process the keyframes to determine the target video frame.

Optionally, the processing the keyframes to determine the target video frame includes: a region determining submodule, configured to perform object segmentation on the keyframes, and determine object regions of respective objects contained in the keyframes; a detection submodule, configured to perform saliency detection on the keyframes to obtain salient regions of the keyframes; and a target video frame determining submodule, configured to determine the target video frame from the keyframes based on the object regions and the salient regions.

Optionally, the target video frame determining submodule includes: an overlapping region determining unit, configured to determine overlapping regions between the object regions and the salient regions; and a target video frame determining unit, configured to determine the target video frame from the keyframes based on proportion information and/or position information of the overlapping regions in the keyframes.

Optionally, the processing module 704 includes: a comparison submodule, configured to compare the video frames with a pre-stored object image for similarities; an object determining submodule, configured to determine a target object in the video frames based on the comparison result; and a target video frame selection submodule, configured to perform selection among the video frames based on object information of the target object to determine the target video frame.

Optionally, the target video frame selection submodule is further configured to: perform background replacement on the video frames based on an object region of the target object; and perform selection among the video frames that have undergone background replacement according to a preset aesthetic feature, to determine the target video frame.

Optionally, the information generation apparatus further includes: a type determination module, configured to determine an image type of the target video frame based on proportion information and/or position information of the target object in the target video frame; and a video frame selection module, configured to perform selection among the target video frames to obtain a target video frame having an image type being a first type.

Optionally, the processing module 704 is further configured to: perform text recognition on the audio data to obtain initial text information; and perform selection among the initial text information according to the object information, to obtain the text information.

Accordingly, the generation module 708 is further configured to: group the target video frame according to the object information to generate at least one group; and combine a target video frame of each group with corresponding target text information to generate graphic and text information of each group.

Optionally, the information generation apparatus further includes: a description type determination module, configured to perform image classification on the target video frame, and determine an image description type corresponding to the target video frame.

Accordingly, the generation module 708 is further configured to: perform selection, according to a preset number, among the target video frames corresponding to each image description type to obtain a type of video frames; and generate the graphic and text information by combining the type of video frames with corresponding target text information.

Optionally, the determination module 706 is further configured to: determine a target time interval based on corresponding times of the i-th target video frame and the (i+1)-th target video frame in the input video; determine text information in the time interval based on the corresponding times of the text information in the input video; and determine the text information in the time interval as target text information corresponding to the i-th target video frame.

Optionally, the generation module 708 is further configured to: input the target video frame and the target text information into a graphic and text information generation model to obtain graphic and text information outputted by the graphic and text information generation model.

In summary, according to the information generation method provided in the disclosure, by obtaining an input video, and extracting video frames and audio data in the input video; performing selection among the video frames to determine a target video frame, and performing text recognition on the audio data to obtain text information; determining, based on a corresponding time of the target video frame in the input video and corresponding time of the text information in the input video, target text information corresponding to the target video frame; and processing the target video frame and the target text information to generate graphic and text information, automatic generation of the graphic and text information corresponding to the video is achieved, the efficiency of graphic and text generation is increased, and human resources are freed.

Described above is a schematic solution of an information generation apparatus according to this embodiment. It should be noted that the technical solution of the information generation apparatus and the technical solution of the information generation method described above belong to the same concept. For details of the technical solution of the information generation apparatus that are not described in detail, reference may be made to the description of the technical solution of the information generation method described above.

Figure 8:
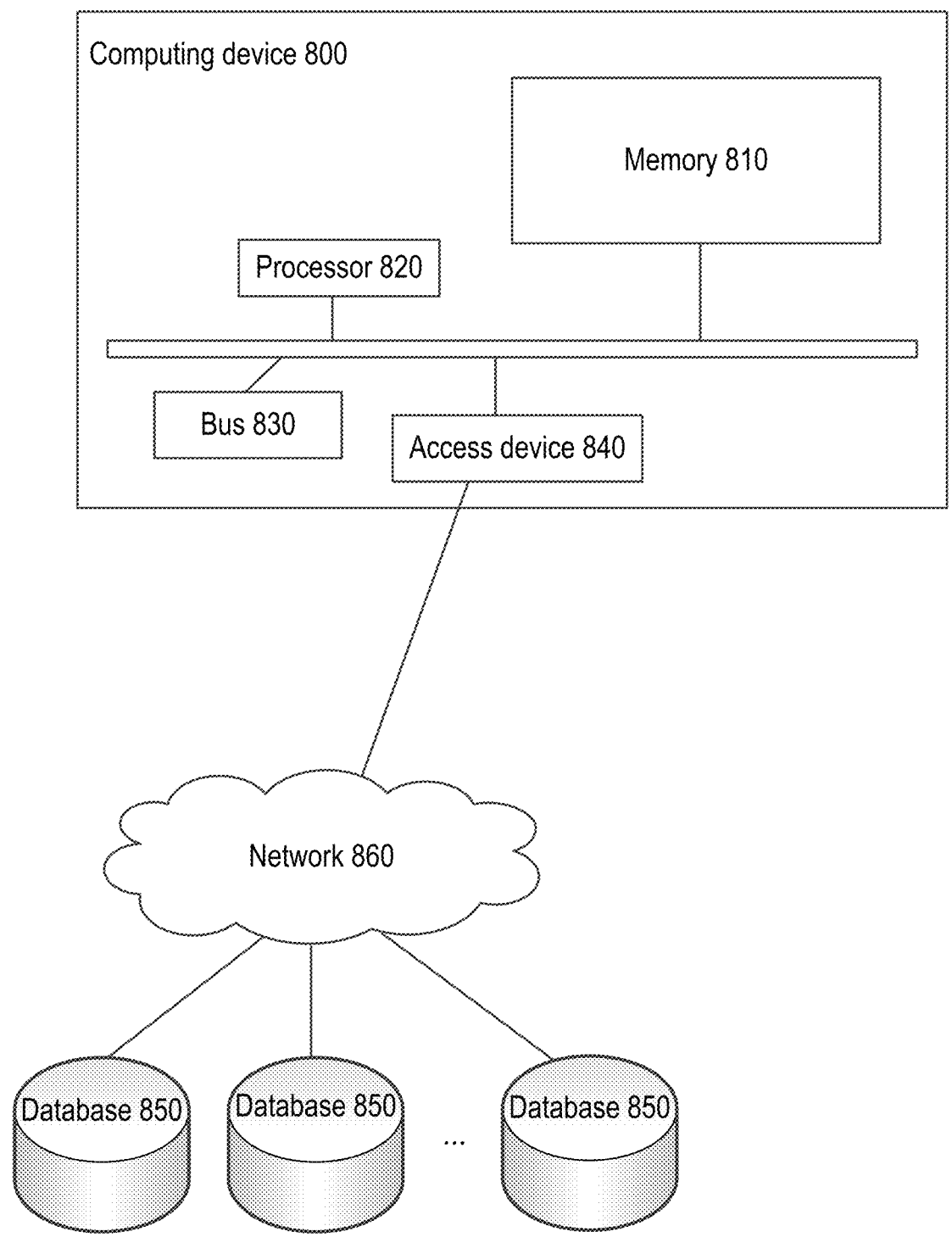
FIG. 8 is a block diagram of a computing device provided by an embodiment of the disclosure.

FIG. 8 shows a block diagram of a computing device 800 provided according to an embodiment of the disclosure. Components of the computing device 800 include, but are not limited to, a memory 810 and a processor 820. The processor 820 and the memory 810 are connected via a bus 830, and a database 850 is used to store data.

The computing device 800 further includes an access device 840 that enables the computing device 800 to communicate via one or more networks 860. Examples of these networks include public switched telephone networks (PSTNs), local area networks (LANs), wide area networks (WANs), personal area networks (PANs), or a combination of communication networks such as the Internet. The access device 840 may include one or more of any type of wired or wireless network interfaces (for example, a network interface card (NIC)), such as IEEE802.11 wireless local region network (WLAN) wireless interfaces, Worldwide Interoperability for Microwave Access (Wi-MAX) interfaces, Ethernet interfaces, universal serial bus (USB) interfaces, cellular network interfaces, Bluetooth interfaces, near-field communication (NFC) interfaces, etc.

In one embodiment of the disclosure, the aforementioned components of the computing device 800 and other components not shown in FIG. 8 may also be connected to one another, for example, via a bus. It should be understood that the block diagram of the computing device shown in FIG. 8 is presented only for illustrative purposes, and is not intended to limit the scope of the disclosure. Those skilled in the art can add or replace any components as needed.

The computing device 800 can be any type of stationary or mobile computing device, including mobile computers or mobile computing devices (for example, a tablet computer, a personal digital assistant, a laptop computer, a notebook computer, and a netbook computer), mobile phones (for example, a smart cellphone), wearable computing devices (for example, a smart watch, and smart glasses), or other types of mobile devices, or stationary computing devices such as a desktop computer or a PC. The computing device 800 may also be a mobile or stationary server.

The processor 820 is configured to execute computer instructions, and when executing the computer instructions, the processor implements the information generation method or the steps of the information generation method.

The foregoing is an illustrative solution of a computing device of the embodiment. It should be noted that the technical solution of this computing device and the technical solution of the information generation method or the information generation method described above belong to the same concept. For details of the technical solution of the computing device that are not described in detail, reference may be made to the description of the technical solution of the information generation method or the information generation method described above.

An embodiment of the disclosure further provides a computer-readable storage medium, storing computer instructions that, when executed by a processor, implement the information generation method or the steps of the information generation method.

The foregoing is an illustrative solution of a computer-readable storage medium of the embodiment. It should be noted that the technical solution of this storage medium and the technical solution of the information generation method or the information generation method described above belong to the same concept. For details of the technical solution of the storage medium that are not described in detail, reference may be made to the description of the technical solution of the information generation method or the information generation method described above.

The specific embodiments of the disclosure have been described above. Other embodiments fall within the scope of the appended claims. In some cases, the actions or steps recited in the claims may be performed in a different order than in the embodiments and still achieve the desired results. In addition, the processes depicted in the drawings do not necessarily require the illustrated particular order or consecutive order to achieve the desired results. In some implementations, multitask processing and parallel processing are also possible or favorable.

The computer instructions include computer program code, which may be in the form of source code, object code, executable files, or some intermediate forms. The computer-readable medium may include: any apparatus or device capable of carrying the computer program code, a recording medium, a USB flash disk, a mobile hard disk, a magnetic disk, an optical disc, a computer memory, a read-only memory (ROM), a random access memory (RAM), electrical carrier signals, telecommunication signals, and a software distribution medium. It should be noted that the content contained in the computer-readable medium can be appropriately added or deleted in accordance with the requirements of the legislation and patent practice in the jurisdiction. For example, in some jurisdictions, according to the legislation and patent practice, the computer-readable medium does not include electrical carrier signals and telecommunication signals.

It should be noted that for simplicity of description, the above method embodiments are all expressed as a combination of a series of actions, but those skilled in the art should know that the embodiments of the disclosure are not limited by the described sequence of actions, because some steps can be performed in other orders or simultaneously according to the embodiments of the disclosure. Furthermore, those skilled in the art should also know that the embodiments described herein are all preferred embodiments, and the involved actions and modules are not necessarily all required by the embodiments of the disclosure.

In the above embodiments, the description of each embodiment has its own emphasis. For parts that are not described in detail in a certain embodiment, reference can be made to related descriptions of other embodiments.

The preferred embodiments of the disclosure above are only disclosed to facilitate explanation of the disclosure. The details of the optional embodiments are not elaborated herein, and are not intended to be limiting. Obviously, many modifications and changes can be made according to the content of the embodiments of the disclosure. The disclosure selects and specifically describes these embodiments to better explain the principles and actual applications of the embodiments of the disclosure, so that those skilled in the art can understand and use the disclosure appropriately. The disclosure is limited only by the claims and the full scope and equivalents thereof.

What is claimed is:

1. A method comprising:
   obtaining an input video;
   extracting video frames and audio data from the input video;
   processing the video frames to determine a target video frame, by comparing the video frames with a pre-stored object image to determine one or more similarities, determining a target object in the video frames based on the one or more similarities, and performing a selection among the video frames based on object information of the target object to determine the target video frame;
   processing the audio data to obtain text information;
   determining, based on a corresponding time of the target video frame in the input video and a corresponding time of the text information in the input video, target text information corresponding to the target video frame; and
   processing the target video frame and the target text information to generate graphic and text information.

2. The method of claim 1, wherein processing the video frames to determine a target video frame comprises extracting keyframes from the video frames and processing the keyframes to determine the target video frame.

3. The method of claim 2, wherein processing the keyframes to determine the target video frame comprises:
performing object segmentation on the keyframes;
determining object regions of respective objects contained in the keyframes;
performing saliency detection on the keyframes to obtain salient regions of the keyframes; and
determining the target video frame from the keyframes based on the object regions and the salient regions.

4. The method of claim 3, wherein determining the target video frame from the keyframes based on the object regions and the salient regions comprises:
determining overlapping regions between the object regions and the salient regions; and
determining the target video frame from the keyframes based on one of proportion information or position information of the overlapping regions in the keyframes.

5. The method of claim 1, wherein performing the selection among the video frames based on object information of the target object to determine the target video frame comprises:
performing background replacement on the video frames based on an object region of the target object; and
performing a selection among the video frames that have undergone background replacement based on a preset aesthetic feature to determine the target video frame.

6. The method of claim 5, further comprising, after performing selection among the video frames that have undergone background replacement to determine the target video frame:
determining an image type of the target video frame based on one of proportion information or position information of the target object in the target video frame; and
performing a selection among the video frames to obtain a target video frame having an image type being a first type.

7. The method of claim 1, wherein processing the audio data to obtain text information comprises:
performing text recognition on the audio data to obtain initial text information; and
performing selection among the initial text information based on the object information to obtain the text information.

8. The method of claim 1, wherein processing the target video frame and the target text information to generate graphic and text information comprises:
grouping the target video frame based on the object information to generate at least one group; and
combining a target video frame of each group with corresponding target text information to generate graphic and text information of each group.

9. The method of claim 1, further comprising, before processing the target video frame and the target text information to generate graphic and text information:
performing image classification on the target video frame;
determining an image description type corresponding to the target video frame based on the image classification;
performing a selection, based on a preset number, among the video frames corresponding to each image description type to obtain a type of video frames; and
generating the graphic and text information by combining the type of video frames with corresponding target text information.

10. The method of claim 1, wherein determining, based on a corresponding time of the target video frame in the input video and a corresponding time of the text information in the input video, target text information corresponding to the target video frame comprises:
determining a target time interval based on corresponding times of a first target video frame and a next target video frame in the input video;
determining text information in the target time interval based on the corresponding times of the text information in the input video; and
determining the text information in the target time interval as target text information corresponding to the first target video frame.

11. The method of claim 1, wherein processing the target video frame and the target text information to generate graphic and text information comprises inputting the target video frame and the target text information into a graphic and text information generation model to obtain graphic and text information outputted by the graphic and text information generation model.

12. A non-transitory computer-readable storage medium for tangibly storing computer program instructions capable of being executed by a computer processor, the computer program instructions defining steps of:
obtaining an input video;
extracting video frames and audio data from the input video;
processing the video frames to determine a target video frame, by comparing the video frames with a pre-stored object image to determine one or more similarities, determining a target object in the video frames based on the one or more similarities, and performing a selection among the video frames based on object information of the target object to determine the target video frame;
processing the audio data to obtain text information;
determining, based on a corresponding time of the target video frame in the input video and a corresponding time of the text information in the input video, target text information corresponding to the target video frame; and
processing the target video frame and the target text information to generate graphic and text information.

13. The non-transitory computer-readable storage medium of claim 12, wherein processing the video frames to determine a target video frame comprises extracting keyframes from the video frames and processing the keyframes to determine the target video frame.

14. The non-transitory computer-readable storage medium of claim 13, wherein processing the keyframes to determine the target video frame comprises:
performing object segmentation on the keyframes;
determining object regions of respective objects contained in the keyframes;
performing saliency detection on the keyframes to obtain salient regions of the keyframes; and
determining the target video frame from the keyframes based on the object regions and the salient regions.

15. The non-transitory computer-readable storage medium of claim 12, the steps further comprising, before processing the target video frame and the target text information to generate graphic and text information:
performing image classification on the target video frame;

determining an image description type corresponding to the target video frame based on the image classification;

performing a selection, based on a preset number, among the video frames corresponding to each image description type to obtain a type of video frames; and generating the graphic and text information by combining the type of video frames with corresponding target text information.

16. The non-transitory computer-readable storage medium of claim 12, wherein determining, based on a corresponding time of the target video frame in the input video and a corresponding time of the text information in the input video, target text information corresponding to the target video frame comprises:

determining a target time interval based on corresponding times of a first target video frame and a next target video frame in the input video;

determining text information in the target time interval based on the corresponding times of the text information in the input video; and determining the text information in the target time interval as target text information corresponding to the first target video frame.

17. The non-transitory computer-readable storage medium of claim 12, wherein processing the target video frame and the target text information to generate graphic and text information comprises inputting the target video frame and the target text information into a graphic and text information generation model to obtain graphic and text information outputted by the graphic and text information generation model.

18. The non-transitory computer-readable storage medium of claim 12, wherein processing the audio data to obtain text information comprises:

performing text recognition on the audio data to obtain initial text information; and performing selection among the initial text information based on the object information to obtain the text information.

19. A device comprising:

a processor configured to:

obtain an input video;

extract video frames and audio data from the input video;

process the video frames to determine a target video frame, by comparing the video frames with a pre-stored object image to determine one or more similarities, determining a target object in the video frames based on the one or more similarities, and performing a selection among the video frames based on object information of the target object to determine the target video frame;

process the audio data to obtain text information;

determine, based on a corresponding time of the target video frame in the input video and a corresponding time of the text information in the input video, target text information corresponding to the target video frame; and process the target video frame and the target text information to generate graphic and text information.

20. The device of claim 19, wherein processing the video frames to determine a target video frame comprises extracting keyframes from the video frames and processing the keyframes to determine the target video frame.

* * * * *